April 5, 1927.

J. W. JEPSON

BRAKE

Filed April 5, 1922

1,623,733

2 Sheets-Sheet 1

Inventor
John W. Jepson
By his Attorneys
Ward, Crosby & Smith

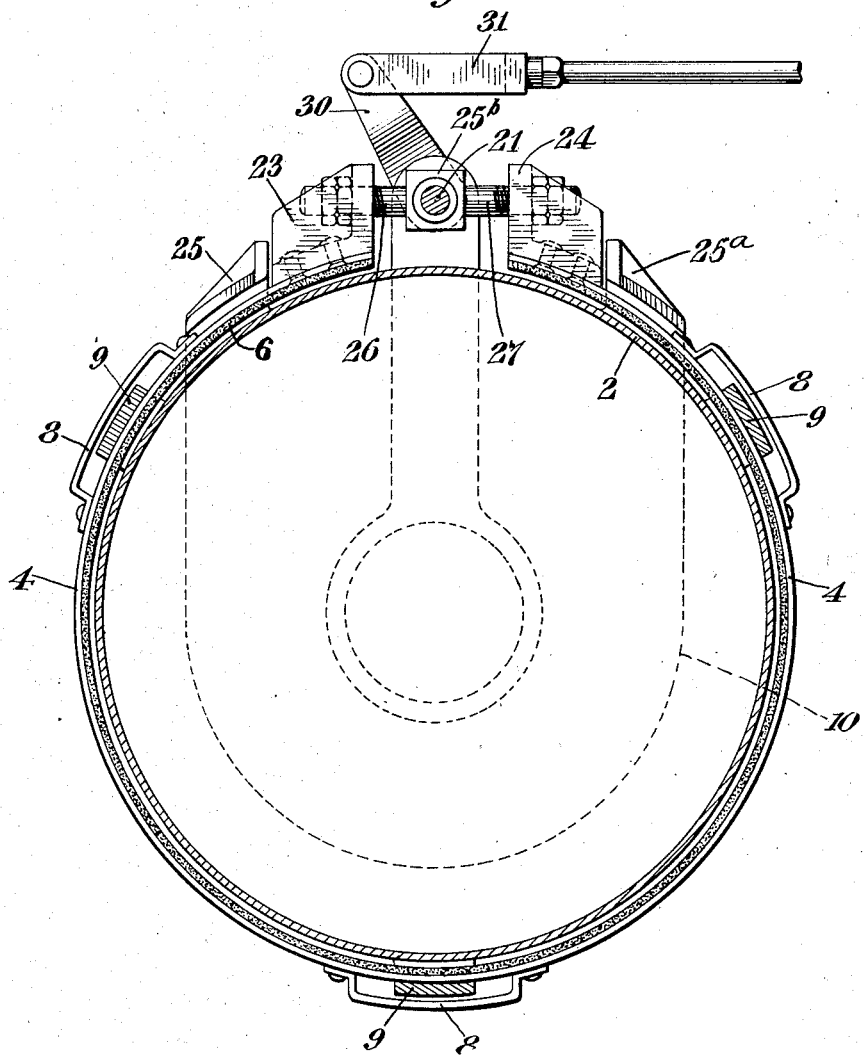

Patented Apr. 5, 1927.

1,623,733

UNITED STATES PATENT OFFICE.

JOHN W. JEPSON, OF ELIZABETH, NEW JERSEY.

BRAKE.

Application filed April 5, 1922. Serial No. 549,715.

My invention relates to improvements in brakes and is especially applicable to ordinary drum brakes such as used on motor vehicles. The main object of the invention is to provide an improved brake arrangement in which braking action may be obtained with very little manual power. A further object is to provide an arrangement in which the braking action is more or less automatically varied with the need thereof. Further and more specific objects, features and advantages will more clearly appear from the detail description given below taken in connection with the accompanying drawings which form a part of this specification.

Figure 1:
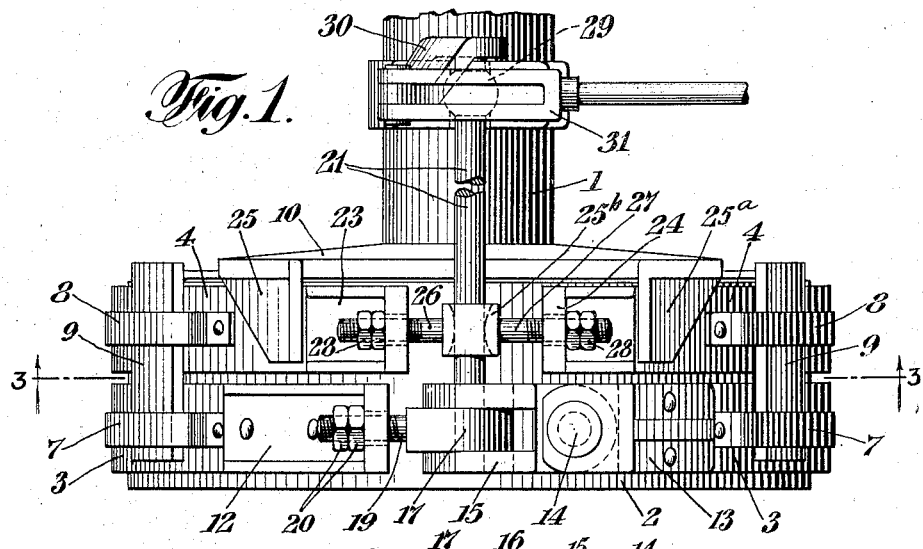
Figure 2:
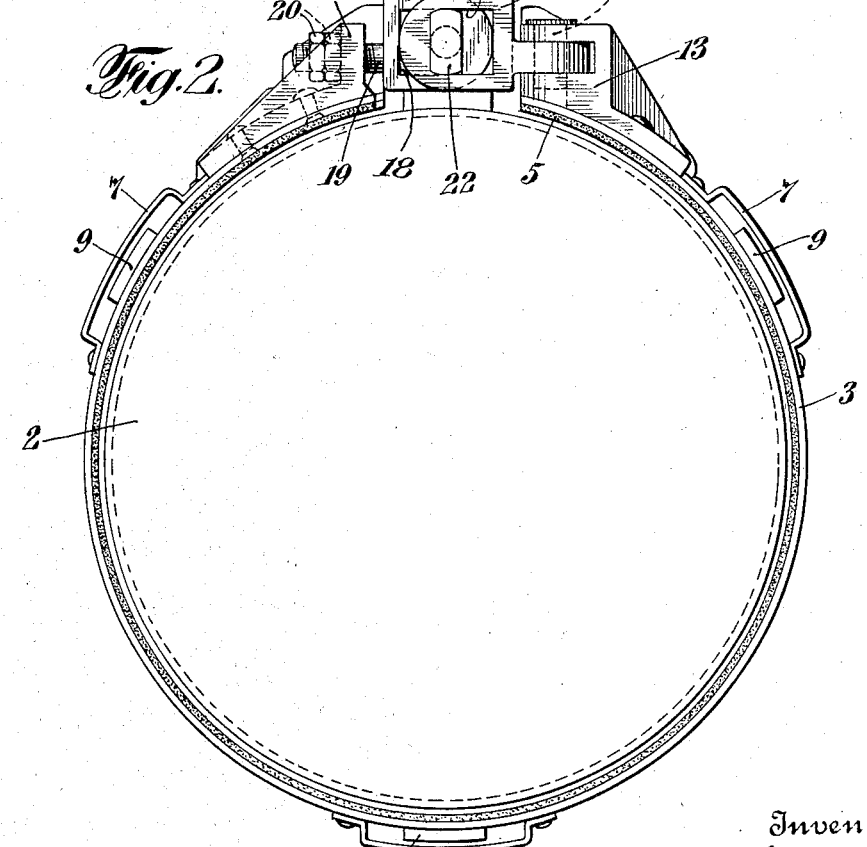

In the drawings, Fig. 1 is a plan view of a braking apparatus embodying my improvements in one form. Fig. 2 is an end view of the same and Fig. 3 is a section taken on the line 3—3 of Fig. 1. Referring to the various figures, 1 represents a suitably housing for a rear axle of a motor vehicle, the axle being suitably journalled therein and carrying on its outer end a suitable wheel or one of the wheels of the vehicle (not shown). Rigidly secured to the axle so as to rotate therewith is a brake drum 2. Arranged to substantially encircle the brake drum 2 are two braking elements or brake bands 3 and 4, each provided with suitable brake linings 5 and 6 respectively. Brake bands 3 and 4 are provided with stirrups 7, 7, 7 and 8, 8, 8 respectively which freely engage over arms 9, 9, 9 in order to suitably support the brake bands when in non-operative position. The arms 9 are relatively stationary and are carried by spider 10 rigid with the axle housing 1.

The brake band 3 is provided with lugs 12 and 13 riveted to its respective ends, the lug 13 being provided with vertical pivot pin 14 to which is pivoted a forked member 15, the sides of which are provided with substantially square openings or apertures 16. Slidably engaged between the sides of the forked member 15 is a flat member 17 likewise provided with a substantially square opening or aperture 18 therethrough which partially overlaps the apertures 16 with the member 15. The member 17 is provided with a bolt member 19 rigid therewith and passing loosely through the upwardly extending rib of the lug 12 and nuts 20 are screwed on the outer end of the member 19. 21 represents a short shaft having a cam member 22 on its outer end which cam member consists of a relatively flat end piece fitting within the openings 16 and 18 whereupon by turning the shaft 21, cam 22 will act upon the outer sides of the openings 16 and 18 and pull the members 15 and 17 toward one another thereby pulling the lugs 13 and 12 toward one another so as to cause the brake band 3 to grab the drum 2 and tend to brake the same.

The brake band 4 is provided with lugs 23 and 24 riveted to the respective ends thereof and the spider 10 is provided with integral laterally extending lugs 25 and 25$^a$ which act as stops respectively for the lugs 23 and 24 on the ends of the brake band 4.

25$^b$ represents a square block suitably apertured so that the shaft 21 passes freely therethrough, the aperture being suitably enlarged at the ends so that the shaft 21 may have more or less of a lateral or twisting motion therein so as to have a substantially universal connection therewith. Rigid with the block 25$^b$ are two bolt members 26 and 27 which pass freely through apertures in standing ribs on the lugs 23 and 24 respectively and have nuts 28 on the ends thereof to prevent the bolts 26 and 27 from pulling through said openings. On its inner end the shaft 21 is provided with a ball and socket joint 29 carried in an upstanding part of the rigid rear axle housing 1. The shaft 21 is also provided with a bell crank lever 30 rigid therewith to the outer end of which is pivoted an operating link 31. In operation when it is desired to apply the brakes, the brake link 31 is pulled manually through any suitable mechanism thereby causing a slight rotation of the shaft 21 so that the cam 22 pulls together the ends of brake band 3 causing the same to grab the brake drum 2. Brake band 3 is normally free to be dragged around with the drum 2 a short distance, the stirrups 7 being sufficiently long for this purpose. As the brake band 3 is thus dragged around with the drum 2 in either direction, it drags and swings the shaft 21 about the ball and socket joint 29 so that the member 25$^b$ and the bolt member 26 or 27, pulls upon the lug 23 or 24 as the case may be, depending upon the direction of rotation of the drum 2. If the drum 2 be rotating clockwise as viewed in Fig. 2, the dragging of the brake band 3 will cause the shaft 21 through the bolt member 26 to pull upon the left hand end of the brake band 4 as viewed in Fig. 3, while the bolt member 27 will slide freely through its opening in lug 24 permitting the lug 24 to come firmly up against the rigid stop 25ª and a slight further swinging movement of the shaft 21 as it is dragged by the brake band 3 will cause the bolt member 26 to further pull up on the brake band 4 and cause it to grab the drum 2. Thereupon both brake bands exert a substantial braking action on the drum 2 and the greater the speed of rotation of the drum 2, the greater will be the drag on the band 3 and hence the greater braking action produced through the band 4 and indeed through both brake bands. As the speed of rotation of the brake drum 2 decreases, the drag on the band 3 is correspondingly decreased, assuming that the manual pressure applied to link 31 is maintained constant, so that the braking action applied through brake drum 4 is correspondingly decreased as desired. In other words with the given application of manual power the braking action varies with the speed of rotation and at high speeds very considerable braking action may be obtained with a very small amount of manual power applied while when the speed decreases the braking action automatically decreases and when applied to a motor vehicle there is little or no danger of locking the wheels.

Should the brake drum 2 be rotating in the opposite direction, that is, counter clockwise as viewed in Figs. 2 and 3, the brake band 3 will be dragged counter clockwise and will cause the shaft 21 to pull upon the right hand end of brake band 4 while the lug 23 is held fast against the stop 25 so that the braking arrangement operates equally well with either direction of rotation of the drum 2. It will be noticed that not only is the braking action automatically varied depending upon the speed in a most advantageous manner, but also that the energy of the moving parts to be braked is utilized in exerting the braking action particularly through the brake band 4 so that very little manual power is required to satisfactorily operate the arrangement.

While I have described my improvements in great detail and in connection with a preferred form thereof, I do not desire to be limited to such details or form since many changes and modifications may be made and the principle of the invention applied to many forms of brake arrangements without departing from the spirit and scope of the invention in its broader aspects.

What I claim as new and desire to secure by Letters Patent is:

1. A brake comprising a moving element to be braked, two braking elements cooperating therewith, and means whereby the drag on one of the braking elements by the moving element causes a braking action by the other braking element, said means comprising a shaft, rotation of which shaft about its axis causes a braking action by one braking element and movement of the shaft laterally by the drag of said braking action causes braking action of the other braking element.

2. A brake comprising a moving element to be braked, two brake bands cooperating therewith, two relatively fixed stops, one for engaging one end of one band to limit rotary movement thereof in one direction and the other for engaging the other end of the same band for limiting rotary movement thereof in the other direction, a shaft rotation of which causes the second band to grip and brake the element and means connecting said shaft with the ends of the first brake band, whereby drag of the shaft by the second band causes the first band to brake said element.

3. A brake comprising a moving element to be braked, two brake bands cooperating therewith, two relatively fixed stops, one for engaging one end of one band to limit rotary movement thereof in one direction and the other for engaging the other end of the same band for limiting rotary movement thereof in the other direction, a shaft, a cam on said shaft and cam means on the end of the second brake band cooperating with said cam whereby rotation of the shaft causes said second band to grip the element, and means on said shaft loosely connected with the respective ends of the first brake band whereby drag of the shaft by the second band causes the first band to brake the element.

4. A brake comprising a moving element to be braked, two brake bands cooperating therewith, two relatively fixed stops, one for engaging one end of one band to limit rotary movement thereof in one direction and the other for engaging the other end of the same band for limiting rotary movement thereof in the other direction, a shaft rotation of which causes the second band to grip and brake the element and means connecting said shaft with the ends of the first brake band, whereby drag of the shaft by the second band causes the first band to brake said element, said last mentioned means comprising a member on the shaft and having a universal movement thereon, rods secured to said member and extending loosely through the ends of the first brake band respectively and means on the ends of said rods to prevent them from pulling out of said brake band ends.

In testimony whereof I have signed my name to this specification.

JOHN W. JEPSON.